INVENTORS
BELA BARENYI
HERMANN RENNER

ATTORNEYS

United States Patent Office 3,561,813
Patented Feb. 9, 1971

3,561,813
DETACHABLE END SECTION FOR PASSENGER CARS
Béla Barényi, Stuttgart-Vaihingen, and Hermann Renner, Magstadt, Wurttemberg, Germany, assignors to Daimler-Benz Aktiengesellschaft, Stuttgart-Unterturkheim, Germany
Filed June 19, 1968, Ser. No. 738,199
Int. Cl. B62d 33/04
U.S. Cl. 296—28
7 Claims

ABSTRACT OF THE DISCLOSURE

A passenger vehicle body including a main portion which extends only a relatively short distance forward of the front wheels of the vehicle and/or a relatively short distance rearward of the rear wheels, and detachable end sections which can be attached to the front and/or the rear end walls of the main portion as an extension thereof, said end sections being hingedly connected to the main portion of the body at two points spaced apart by a relatively large distance in the region of the upper edge of the wall of the detachable end section which faces the main portion of the body, said detachable end section lockingly engaging the main portion of the body at at least one point in the region of the lower edge of the wall of the end section facing the main body portion.

---

The present invention relates to a detachable end section for passenger vehicles.

In view of the extremely high traffic density, noted particularly in urban areas, and the resulting shortage of available parking space, it is increasingly desirable for new automobile bodies to have a short overall length. Because of practical considerations of passenger convenience, it is undesirable, and impossible in many cases, to further reduce the length of the passenger space of the motor vehicle. Thus, a reduction in the overall length of the vehicle may be realized only by reducing the length of either the engine compartment or the baggage department. Given particular engine characteristics, a reduction of the length of the engine compartment may not be possible. Thus, the only practical means of effecting a reduction of the overall length of the vehicle is by reducing the length of the baggage compartment.

Of course, shortening the portions of the automobile body disposed in front of or behind the passenger compartment necessarily entails a reduction of the protection afforded the passengers in the event of a collision. This reduction results from decreasing the deformation paths which normally serve to insulate, to some extent, the passenger compartment.

This latter problem, however, is most critical in the more serious impact accidents which occur in high-speed traffic on turnpikes and other rural highways. Thus, for driving of this sort, readily-deformable end sections which can absorb considerable amounts of impact energy are particularly desirable. Further, greater baggage space is required for cross-country driving. On the other hand, the overall length of the passenger vehicle and the space necessary therefor are considerably less critical in the case of driving in rural areas than they are in urban traffic.

Accordingly, it is an object of the present invention to provide a motor vehicle body which effects a balance between the short overall length desirable for city driving and the increased impact protection and baggage space desirable for rural traffic.

Further, it is an object of the present invention to provide a readily-detachable end section which can be attached to a relatively short motor vehicle body to provide for enhanced impact protection and additional baggage space, when desired.

It is an additional object of the present invention to provide detachable end sections which can be attached, as desired, to either the front or rear ends of the motor vehicle.

Still another object of present invention is to provide a detachable end section for a passenger vehicle which may be readily attached or detached as desired, yet which, when attached to the vehicle, may be locked thereto, thus rendering the baggage space of the end section inaccessible except from the interior of the passenger space.

Finally, it is an object of the present invention to provide detachable end sections which can be attached to the front and/or rear end walls of a motor vehicle, which sections may be of different lengths to suit the wishes of the vehicle operator and which may be coordinated with the styling of the motor vehicle so as to present a pleasing appearance when attached thereto.

These objects are accomplished, in accordance with the present invention, by providing interchangeable end sections which are hingedly connected to the vehicle, in the region of the upper edge of the wall of the end section facing the vehicle at two points spaced as far apart as possible, the detachable end section being lockingly engaged with the vehicle at at least one point in the region of the lower inner edge of the detachable end section. A detachable end section of this sort can be readily and simply coupled with the passenger vehicle body as desired, for example, on cross-country drives and other long trips when a large amount of baggage is to be transported. Further, such end sections can be designed so that identical sections may be utilized for several types of automobiles. The present invention also contemplates the construction of several detachable end sections of different lengths which can be selectively employed in connection with a single vehicle, depending upon the requirements and wishes of the user.

In a preferred embodiment of the present invention, the upper suspension devices may be arranged about a common axis, which axis extends at right angles to the direction of travel of the vehicle. With such an arrangement, the suspension devices can be constructed in the form of hinges having hinge pins which may be inserted at right angles to the diretcion of travel of the vehicle. The assembly of the detachable end sections may be greatly facilitated, however, if one part of the suspension device is fashioned in the form of a hook into which the mating part is hung, thus permitting assembly of the detachable end section merely by lifting the end section to a height slightly above its assembled position. This construction obviates the accurate positioning of the end section necessary when hinge pin devices are employed. According to a further feature of the present invention, a trunk lock, preferably a tap lock, is employed, which lock can be opened from the interior of the vehicle. The present invention also contemplates the use of screws or bayonet-type locks which can be operated from the interior of the detachable end section.

According to a further feature of the present invention, multiple-contact plugs are provided on the detachable end sections in the region of the lower locking member for supplying energy to those devices which so require, for example, headlights, etc. Alternatively, secondary plug sockets may be provided on the detachable end section for the necessary electric, pneumatic or hydraulic connections. Preferably, these multiple-contact plugs are disposed in the region of the lower locking device, particularly centrally-disposed. This arrangement is particularly advantageous because the necessary connections for energy supply may be established simultaneously with the locking of the detachable end section in place as the end section, having been hung in the upper suspension devices, is pivoted downwardly.

According to a particularly advantageous embodiment of the present invention, the detachable end sections may be constructed in such a manner as to be more readily-deformable than the central section of the passenger vehicle, including the passenger compartment thereof. In this manner, the detachable end sections may serve to dissipate the impact energy generated by collisions of limited impact force, thus precluding any deformation of the central portion of the passenger vehicle. Because of the benefits of this protective aspect of the detachable end section, such a section may be incorporated in vehicles which are not otherwise of short overall length, merely for further increasing the safety of the passengers.

The detachable end sections according to the present invention can be provided with at least one bumper or shock-absorbing member, which is preferably of a tubular shape and is spaced from the end section. A shock-absorbing member of this sort serves a dual purpose. First, the member absorbs and dissipates slight impacts, thereby preventing damage to the detachable end section. Secondly, the member, spaced from the end section, may serve as a carrying handle for the detached end section.

Preferably, the detachable end sections in accordance with the present invention should extend across the entire width of the passenger vehicle. The end sections may be constructed to extend, in a vertical plane, up to the lower edge of the vehicle windows; however the height may be limited to cover only that area beneath the vehicle lights. The detachable end sections may be utilized in connection with a passenger vehicle which is otherwise relatively sharply cut-off a short distance behind and/or in front of the passenger compartment. The end sections thus employed may be so designed as to impart a pontoon shape to the vehicle or in such a manner as to lengthen the vehicle at the full height thereof.

These and other objects, features and advantages of the present invention will become more obvious from the following description, when taken in connection with the accompanying drawings which show, for purposes of illustration only, two embodiments in accordance with the present invention, and wherein.

Figure 1:
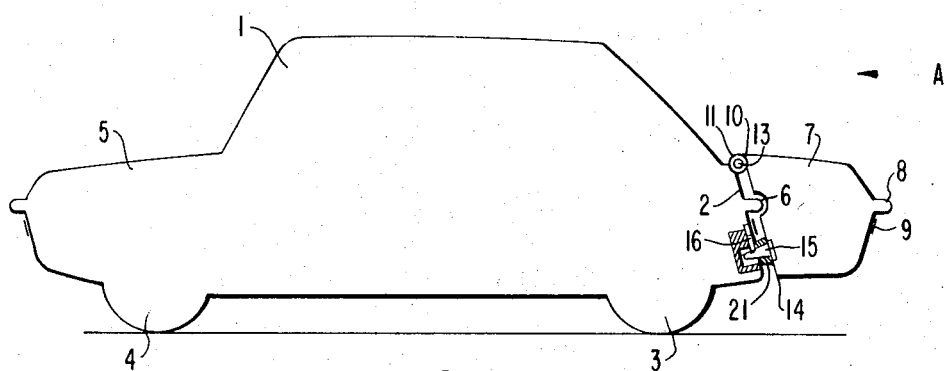
FIG. 1 shows a schematic lateral view of a passenger vehicle.

Referring now to the drawings wherein like reference numerals are used throughout the various views to designate like parts, and more particularly to the embodiment of FIG. 1, the passenger vehicle 1 normally terminates at its rear end wall 2 located a relatively short distance behind the wheels 3, which are illustrated in schematic form. The rear portion of the vehicle thus projects as slightly as possible behind the rear wheels, whereas the vehicle incorporates a front structure 5 which is disposed forward of the front wheels 4 so as to provide relatively long deformation paths in the event of a collision. The space between the front wheels 4 and the rear wheels 3 is entirely occupied by the passenger compartment, thus leaving little space for baggage. Thus, the basic vehicle for use in urban traffic extends rearward only to the end wall 2 and the bumper 6.

To this basic vehicle, the end section 7, shown in bold lines, can be attached if traffic conditions make the extra length desirable, or if baggage space is needed. As can be seen from FIG. 2, the end section 7 extends across almost the full width of the vehicle and is equipped with a bumper 8, as well as an additional license plate 9. Of course, if it is impossible to secure an additional license plate, the license plate normally mounted on the end wall 2 could be relocated on the detachable end section 7. The end section 7 complements the vehicle 1, which is itself relatively steeply cut off at the rear end, and imparts thereto a pontoon shape.

At the upper inner edge 10 of the end section 7, hinge-type fittings 11 are mounted at two points 10a disposed as far apart as possible from one another; the axis 12 of these fittings is disposed at right angles to the travel direction of the vehicle. Pins 13 are inserted in the direction of the axis 12 after the end section 7 has been lifted into the appropriate position.

In the region of the lower inner edge 14, a trunk lock 15, constructed in the form of a tap lock is disposed in the center of the vehicle. The lock 15 serves for supporting and securing the end section 7. A latch 16, which cooperates with the lock 15, is provided in the rear end wall of the vehicle. The latch 16 is designed so that it can be operated only from the interior of the vehicle.

Multiple-contact plugs 17, which supply the energy for the illumination of the license plate, the tail lights 28 and any secondary sockets that may be provided for trailers or interior lights for the end section 7, are disposed either concentrically with or directly next to the trunk lock 15. When the end section 7 is pivoted about the axis 12, the multiple-contact plugs 17 are simultaneously engaged and disengaged.

The end section 7 is constructed in the form of a trunk having a lid which can be opened (not shown). The end section 7, as shown, has a height which when assembled, causes the upper edge of the end section to lie just below the lower edge of the window panes, which are not shown.

Figures 2, 4:
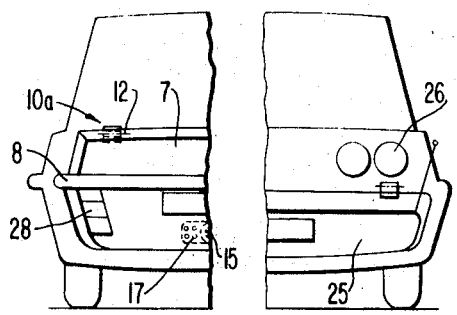
FIG. 2 illustrates half of the rear structure viewed in the direction A of a vehicle according to FIG. 1.
FIG. 4 shows a schematic view of half of the front structure viewed in the direction B of the vehicle according to FIG. 3.
Figure 3:
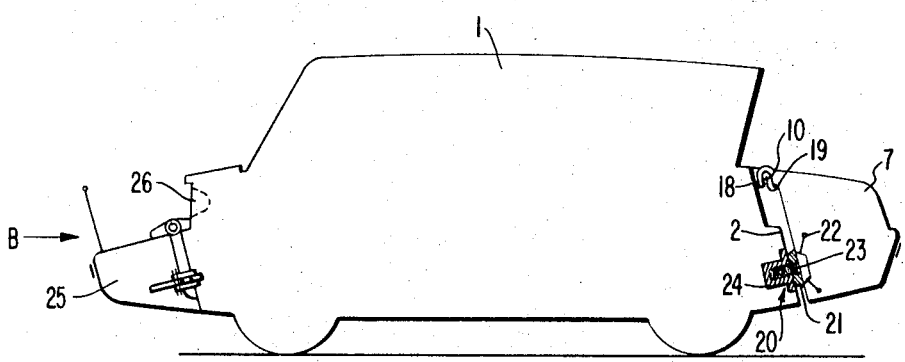
FIG. 3 is a schematic lateral view of a second embodiment.

The embodiment described in FIGS. 3 and 4 includes an end section corresponding in shape to the end section 7 of FIGS. 1 and 2, but which is mounted to the rear end of the vehicle structure with fittings that differ structurally from those of the embodiment of FIGS. 1 and 2.

According to FIGS. 3 and 4, downwardly-open hooks 18 are formed integrally with the end section 7 or securely fastened thereto in the region of the edge 10. Accordingly, brackets 19 are provided on the vehicle structure spaced appropriately from the end wall 2. The brackets 19 are positioned so as to be engaged by the hooks 18 from above. In order to attach the end section 7, it need only be lifted to a height whereby the hooks 18 are above the brackets 19; the hooks 18 may be hung into the brackets 19.

The lower support 20 includes a spacer element 21 by means of which the end section 7 rests either on the rear wall 2 or on the nut 24. Screws 23, which are accessible from the interior of the end section 7 and provided with suitable handlers 22, are threadedly engaged with corresponding nuts 24. With this type of latch device, it is similarly impossible to gain access from the outside of the end section.

The vehicle, as illustrated in FIGS. 3 and 4, is provided with an additional detachable end section 25, at its forward end. Like the end section 7, the end section 25 extends over almost the entire width of the vehicle. However, it can be seen that the end section 25 does not extend up to the level of the front windshield (not shown), but rather terminates just below the headlights 26. The end section 25 is connected with the vehicle in the same manner as the two end sections described above.

The present invention is not limited to the illustrated embodiments. Thus, it is within the contemplation of the present invention to arrange a bumper or several shock-absorbing members surrounding the detachable end section and spaced therefrom so that the bumper or other shock-absorbing members can also be utilized as carrying handles. Further, it is particularly desirable to construct the detachable end sections so that the strength thereof is less than that of the walls of the passenger compartment; thus, the end sections may be constructed so that they absorb and dissipate considerable impact energy in case of a collision. It is also within the scope of the present invention to utilize bayonet-type catches in place of the locking devices illustrated. Further, the dimensions of the detachable end sections may be such that the rear end sections may extend over the entire height of the vehicle. Finally, a variety of detachable end sections of different lengths may be selectively employed in connection with a single vehicle and identical detachable end sections may be employed in connection with a number of different vehicle types.

While two embodiments in accordance with the present invention have been shown and described, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

What is claimed is:

1. An automotive vehicle body arrangement for a passenger car, affording minimum body length for urban driving, while providing an extended length for rural travel in order to assure safety and baggage space for the passengers, the external dimensions of the length of the body being defined by the front and rear walls of the vehicle body, said walls extending only substantially beyond the front and/or rear wheels, said arrangement being provided with independent means for storing baggage and other items and for absorbing the shock of impact of another vehicle with said automotive vehicle, said independent means comprising at least one detachable end section provided with connecting means for attaching said at least one end section to the front and/or rear end walls of said vehicle body, wherein said end section is adapted to be attached to one or both of said front and rear end walls of said vehicle body by means of pivotal connecting means provided on a wall of said detachable end section facing said vehicle body, said pivotal connecting means being disposed in the region of the upper edge of said wall at two widely-spaced points thereon, and further comprising locking means disposed in the region of the lower inner edge of said wall at at least one point thereon.

2. A vehicle body arrangement according to claim 1, wherein said locking means include trunk lock means, said trunk lock means being adapted to be opened from the interior space of said vehicle body.

3. A vehicle body arrangement according to claim 1, wherein said locking means include bayonet-type catch means, said catch means adapted to be operated from the interior space of said detachable end section.

4. A vehicle body arrangement according to claim 1, further comprising multiple-contact plug means disposed in the region of said locking means, said plug means operatively engaging with power supply means in said vehicle body simultaneously with the engagement of said locking means.

5. An automotive vehicle body arrangement for a passenger car, affording minimum body length for urban driving while providing an extended length for rural travel in order to assure safety and baggage space for the passengers, the external dimensions of the length of the body being defined by the front and rear end walls of the vehicle body, said vehicle body comprising:

a main body portion including a passenger space and an engine space, said main body portion including said front end wall and said rear end wall, at least one of which end walls are positioned only slightly beyond the corresponding wheel, said arrangement being provided with independent means for storing baggage and other items and for absorbing the shock of impact of another vehicle with said automotive vehicle, said independent means including
at least one detachable end section means, said end section means being selectively attached to one or both of said end walls by suitable attaching means, said attaching means including pivotal connecting means disposed at two widely-spaced points in the region of the upper edge of a wall of said end section means facing the main body portion, and selective locking means disposed at at least one point in the region of the lower inner edge of said wall of said end section means.

6. A passenger motor vehicle body according to claim 5, wherein detachable end section means are attached to both said front end wall and said rear end wall of said main body portion.

7. A passenger motor vehicle body according to claim 5, wherein said pivotal connecting means include hook-shaped members open at the bottom thereof, secured at two points on said detachable end section means, and corresponding bracket members secured to the end wall of said main body portion facing said detachable end section means, said bracket members being spaced from said end wall to enable said hook-shaped members to enclose said bracket members and be suspended therefrom.

References Cited

UNITED STATES PATENTS

| | | | |
|---|---|---|---|
| 1,648,211 | 11/1927 | Baker | 224—42.07 |
| 2,493,368 | 1/1950 | Smelker | 296—26 |
| 2,569,218 | 9/1951 | Bailey | 296—1 |
| 2,693,982 | 11/1954 | Barenyi | 296—28(.8) |

FOREIGN PATENTS

| | | | |
|---|---|---|---|
| 867,201 | 2/1953 | Germany | 296—1 |
| 873,940 | 4/1953 | Germany | 296—28 |
| 424,791 | 2/1935 | Great Britain | 296—26 |
| 152,441 | 1/1932 | Switzerland | 296—37 |
| 656,914 | 1/1929 | France | 224—42.42 |

LEO FRIAGLIA, Primary Examiner

J. A. PEKAR, Assistant Examiner